(No Model.)
G. L. HUDSON.
CORN PLANTER.
No. 321,362. Patented June 30, 1885.
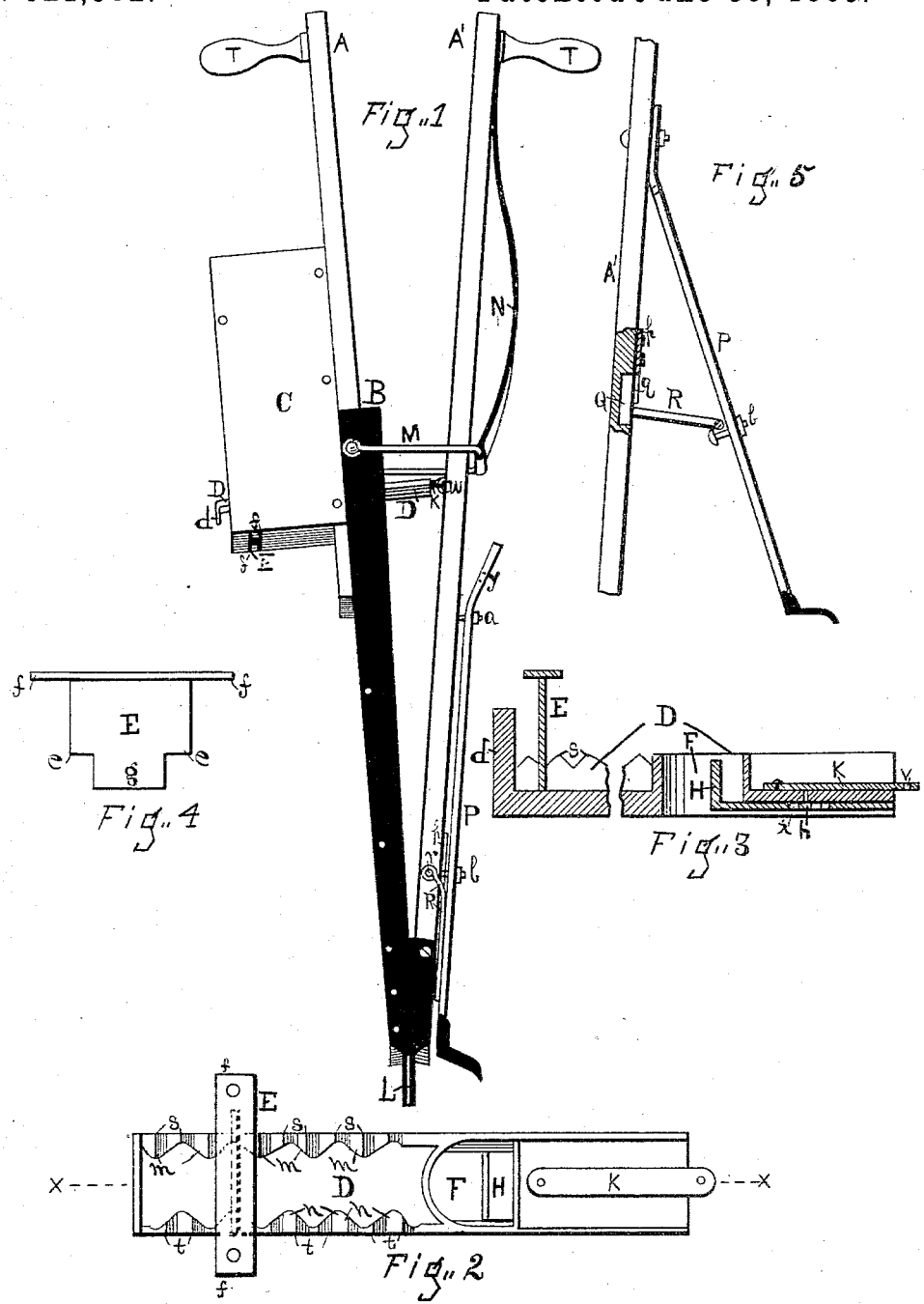
Witnesses:
Inventor:
Gilbert L. Hudson
by Geo H Lothrop
Atty.

UNITED STATES PATENT OFFICE.

GILBERT L. HUDSON, OF ROMEO, MICHIGAN, ASSIGNOR TO BYRON J. FLUMERFELT, OF SAME PLACE.

CORN-PLANTER.

SPECIFICATION forming part of Letters Patent No. 321,362, dated June 30, 1885.

Application filed January 15, 1885. (No model.)

*To all whom it may concern:*

Be it known that I, GILBERT L. HUDSON, of Romeo, in the county of Macomb and State of Michigan, have invented a new and useful Improvement in Corn-Planters, of which the following is a specification.

My invention consists in certain improvements in hand corn-planters, mainly designed to insure even and regular filling of the seed-cup, and also designed to adapt the planter to use with one or two hands, as desired, and is fully set forth in the claims.

Figure 1 is a perspective of the complete planter. Fig. 2 is a bottom plan view of the reciprocating slide which contains the seed-cup. Fig. 3 is a section on line $x\,x$, Fig. 2. Fig. 4 is an elevation of the device for shaking the slide; and Fig. 5 is an elevation of part of one of the oscillating levers, with the adjustable fulcrum in position to adapt the planter to use with one hand.

A A′ represent two oscillating levers having handles T T secured thereto, and pivoted to each other near the lower end in the ordinary manner, as shown in Fig. 1.

L represents the spades, which are usually attached to the lower ends of levers A A′ in corn-planters of this class.

B represents the seed-tube which conveys the seed from the seed-cup to the lower ends of the levers, and is composed of a strip of thin metal, with its edges nailed to the edges of one of the levers.

C represents a seed-box, in the bottom of which plays a reciprocating slide, D, having a seed-cup, F, formed therein by two partitions, and regulated in size by the sliding gate H, which is adjustably secured to the top of the slide D by the screw $h$, passing through a slot in the gate, as shown in Fig. 2. The slide D consists of a piece of metal having a top and two sides, hollow in the center, having at its outer end a downwardly-projecting lip, $d$, to prevent its being drawn entirely out of the seed-box, and having the lower edges of its sides serrated, as shown at $s$, Figs. 2 and 3, and having the inner surfaces of its sides serrated, as shown at $m\,n$, Fig. 2; but the projections of the serrations $m\,n$ are not opposite each other, but are staggered, as clearly shown in Fig. 2.

E represents a sheet of thin metal having projecting flanges $f\,f$, by which it is fastened to the bottom of the seed-box, the plate E projecting up through the bottom of the seed-box. The upper end of plate E has two shoulders, $e\,e$, and a central projection, $g$, the width of projection $g$ being such that it will just fit loosely between one projection $n$ and the recess between two opposite projections, $m$, on the inner sides of slide D.

K represents a link pivoted to slide D at one end, and at the other end pivoted to the lever A, so that the oscillation of the levers A A′ reciprocates the slide D in a manner well understood.

M represents a bail pivoted to lever A and embracing lever A′.

N represents a flat spring fastened to lever A′, and having a loop formed on its free end to engage with bail M, so that when it is desired to use the planter with one hand the force of spring N, acting on bail M, will tend to keep levers A A′ apart. The free end of the spring is slipped off from the bail when the planter is to be used with both hands, and the spring lies close along the outer side of lever A′.

P represents an adjustable fulcrum, which serves as a stop when the planter is used with both hands, and is then carried in the position shown in Fig. 1, being fastened to the outer side of lever A′ by the bolt and nut $a$, which passes through lever A′, and by the bolt and nut $b$, the head of which bolt lies in a recess, Q, in lever A′, the shank of said bolt passing through a slot in a plate of thin iron, $p$, fastened to lever A′, said slot being shown at $q$, Fig. 5.

R represents a bail, pivoted at $r$ to lever A′, and the upper end of fulcrum P is bent and pierced with a hole, $y$, Fig. 1.

When it is desired to use the planter with one hand, spring N is made to engage with bail M, as shown in Fig. 1, and fulcrum P is removed from its position, as shown in Fig. 1, by unscrewing the nut from bolt $a$, loosening the nut on bolt $b$, and removing the fulcrum from lever A′. The bolt $a$ is now passed through hole $y$, and bail R raised until it bears against the fulcrum above bolt $b$, when the nuts are screwed up on said bolts, and the fulcrum is held firmly in the position shown in Fig. 5. The planter can now be used with one hand by taking hold of the handle on lever A and pressing lever A toward lever A', when the spades are properly placed in the ground, the fulcrum P resting on the ground and supporting lever A' against motion.

W represents a staple, which forms the pivotal connection of link K with lever A'.

The operation of my invention is similar to that of an ordinary corn-planter, and needs no detailed description.

In ordinary planters of this class the seed in the seed-box is apt to become jammed, so that it does not feed regularly and evenly into the seed-cup in the slide at each stroke thereof. In my invention, whenever the slide moves in either direction, the serrations s ride over the shoulders e on plate E, and the slide is thus vibrated rapidly in a vertical plane, which shakes up the overlying seed and prevents it from becoming lodged. At the same time the projections m m alternately come in contact with opposite edges of the central projection, g, on plate E, and the slide is rapidly vibrated in a horizontal plane, so that the slide has a reciprocating motion, and a vertical vibration, and a horizontal vibration at the same time. This effectually prevents the overlying seed from becoming lodged or jammed in the seed-box, and insures a regular and steady feed of seed to the seed-cup.

What I claim as my invention, and desire to secure by Letters Patent, is—

1. In a planter, the combination, with a reciprocating slide carrying a seed-cup and having its lower edges serrated, of a metal plate secured below the slide and supporting the serrated edges thereof, substantially as shown and described.

2. In a planter, the combination, with a reciprocating slide carrying a seed-cup and having downwardly-projecting sides whose inner surfaces are serrated, the serrations on said inner sides being staggered, of a plate secured to the seed-box and projecting between said serrated sides, of greater width than the space between the points of said serrations, substantially as shown and described.

3. In a planter, the combination, with a reciprocating slide carrying a seed-cup and having downwardly-projecting sides whose lower edges are serrated, and whose inner sides are also serrated, said last-named serrations being staggered, of a plate secured to the seed-box below said slide, having shoulders which support the serrated edges of said slide, and having a central projection entering between the serrations on the inner sides of the slide, substantially as shown and described.

4. In a hand corn-planter, the combination of the attachable and detachable fulcrum P, having the bolts a and b, and the leg A', provided with the seat Q, plate p, and bail R, with the leg A and seed holding and dropping devices, substantially as described.

5. In combination with the two levers of a corn-planter, a bail pivoted to one lever and a spring secured at one end to the other lever, and having its free end adapted to engage detachably with said bail, substantially as shown and described.

GILBERT L. HUDSON.

Witnesses:
MARVIL I. BRABB,
F. A. SMITH.